US008347635B2

(12) United States Patent
Durocher et al.

(10) Patent No.: US 8,347,635 B2

(45) Date of Patent: Jan. 8, 2013

(54) LOCKING APPARATUS FOR A RADIAL LOCATOR FOR GAS TURBINE ENGINE MID TURBINE FRAME

(75) Inventors: Eric Durocher, Vercheres (CA); John Pietrobon, Outremont (CA)

(73) Assignee: Pratt & Whitey Canada Corp., Longueuil, Quebec (CA)

( * ) Notice: Subject to any disclaimer, the term of this patent is extended or adjusted under 35 U.S.C. 154(b) by 748 days.

(21) Appl. No.: 12/324,993

(22) Filed: Nov. 28, 2008

(65) Prior Publication Data

US 2010/0132370 A1 Jun. 3, 2010

(51) Int. Cl.
*F02C 7/20* (2006.01)
*F01D 25/16* (2006.01)
*F16B 39/10* (2006.01)

(52) U.S. Cl. ............ 60/798; 60/797; 415/142; 415/126; 415/213.1; 415/214.1; 29/889.22; 29/464; 29/525.01; 29/525.11; 411/119; 411/122

(58) Field of Classification Search .................... 60/797, 60/798; 415/142, 126, 127, 128, 213.1, 214.1, 415/209.4, 210.1; 29/889.2, 889.21, 889.22, 29/434, 464, 469, 525.01, 525.11, 52; 411/119, 411/121, 122; 41/119, 121, 122
See application file for complete search history.

(56) References Cited

U.S. PATENT DOCUMENTS 2,616,662 A 11/1952 Mierley
2,620,157 A 12/1952 Morley et al.
2,639,579 A 5/1953 Willgoos
2,692,724 A 10/1954 McLeod
2,829,014 A 4/1958 May
2,869,941 A 1/1959 Shoup, Jr. et al.
2,919,888 A 1/1960 Simmons
2,928,648 A 3/1960 Haines et al.
2,941,781 A 6/1960 Boyum
3,084,849 A 4/1963 Dennison
3,261,587 A 7/1966 Rowley
3,312,448 A 4/1967 Hull, Jr. et al.
3,844,115 A 10/1974 Freid
4,245,951 A 1/1981 Minnich
4,304,522 A 12/1981 Newland
4,478,551 A 10/1984 Honeycutt, Jr. et al.
4,558,564 A 12/1985 Bouiller et al.
4,607,422 A * 8/1986 Scaramucci ............... 29/890.13
4,965,994 A 10/1990 Ciokajlo et al.
4,979,872 A * 12/1990 Myers et al. .................. 415/142
4,987,736 A * 1/1991 Ciokajlo et al. ................ 60/797
5,094,117 A * 3/1992 Mikel et al. ...................... 74/395
5,160,251 A 11/1992 Ciokajlo
5,307,622 A 5/1994 Ciokajlo et al.
5,361,580 A 11/1994 Ciokajlo et al.
5,438,756 A 8/1995 Halchak et al.
5,443,229 A 8/1995 O'Brien et al.
5,483,792 A 1/1996 Czachor et al.
5,564,897 A 10/1996 Mansson (Continued)

*Primary Examiner* — William H Rodriguez
*Assistant Examiner* — Michael B Mantyla
(74) *Attorney, Agent, or Firm* — Norton Rose Canada LLP

(57) ABSTRACT

A gas turbine engine mid turbine frame apparatus includes a an inner case supporting a bearing, an outer case to which the inner case is mounted, and an apparatus for radially positioning one relative to the other, the apparatus including a plurality of radial locators extending outwardly of the outer case and an associated locking apparatus. The locking apparatus is mounted adjacent to but independent of the locators and provides for anti-rotation of the radial locators once installed.

14 Claims, 10 Drawing Sheets

U.S. PATENT DOCUMENTS

| | | | | |
|---|---|---|---|---|
| 5,634,767 | A | 6/1997 | Dawson | |
| 5,746,574 | A | 5/1998 | Czachor et al. | |
| 5,813,214 | A | 9/1998 | Moniz et al. | |
| 6,185,925 | B1 | 2/2001 | Proctor et al. | |
| 6,267,397 | B1 | 7/2001 | Hamada et al. | |
| 6,438,837 | B1 | 8/2002 | Berry et al. | |
| 6,439,616 | B1 * | 8/2002 | Karafillis et al. | 285/205 |
| 6,619,030 | B1 | 9/2003 | Seda et al. | |
| 6,669,442 | B2 | 12/2003 | Jinnai et al. | |
| 6,708,482 | B2 | 3/2004 | Seda | |
| 6,763,654 | B2 | 7/2004 | Orlando et al. | |
| 6,793,458 | B2 | 9/2004 | Kawai et al. | |
| 6,796,765 | B2 | 9/2004 | Kosel et al. | |
| 6,883,303 | B1 | 4/2005 | Seda | |
| 6,905,303 | B2 | 6/2005 | Liu et al. | |
| 6,935,837 | B2 | 8/2005 | Moniz et al. | |
| 7,182,562 | B2 * | 2/2007 | Botosan et al. | 411/122 |
| 7,195,447 | B2 | 3/2007 | Moniz et al. | |
| 7,269,938 | B2 | 9/2007 | Moniz et al. | |
| 7,334,981 | B2 | 2/2008 | Moniz et al. | |
| 7,341,429 | B2 | 3/2008 | Montgomery et al. | |
| 7,731,463 | B2 * | 6/2010 | Davis | 411/119 |
| 2006/0188357 | A1 * | 8/2006 | Rowe et al. | 411/119 |
| 2007/0044307 | A1 | 3/2007 | Bergerot et al. | |
| 2007/0231134 | A1 | 10/2007 | Kumar et al. | |
| 2007/0237635 | A1 | 10/2007 | Nagendra et al. | |
| 2007/0261411 | A1 | 11/2007 | Nagendra et al. | |
| 2007/0271923 | A1 | 11/2007 | Dawson | |
| 2007/0292270 | A1 | 12/2007 | Suciu et al. | |
| 2008/0022692 | A1 | 1/2008 | Nagendra et al. | |
| 2008/0134687 | A1 | 6/2008 | Kumar et al. | |
| 2008/0134688 | A1 | 6/2008 | Somanath et al. | |

* cited by examiner

LOCKING APPARATUS FOR A RADIAL LOCATOR FOR GAS TURBINE ENGINE MID TURBINE FRAME

TECHNICAL FIELD

The application relates generally to gas turbine engines and more particularly, to engine case structures therefor, such as mid turbine frames and similar structures.

BACKGROUND OF THE ART

A mid turbine frame (MTF) system, sometimes referred to as an interturbine frame, is located generally between a high turbine stage and a low pressure turbine stage of a gas turbine engine to support number one or more bearings and to transfer bearing loads through to an outer engine case. The mid turbine frame system is thus a load bearing structure, and the safety of load transfer is one concern when a mid turbine frame system is designed. Among other challenges facing the designer is centering the bearing housing within the case, which is also affected by tolerance stack-up due to the number of components present in the system, etc. Still other concerns exist with present designs and there is accordingly a need to provide improvements.

SUMMARY

According to one aspect, provided is a gas turbine engine having a mid turbine frame, the mid turbine frame comprising: an outer case, an inner case, at least three spokes extending radially between the inner and outer cases, and a gas path defined through the mid turbine frame, the gas path disposed between the inner and outer cases, the inner case supporting at least one main shaft bearing, the inner case radially adjustably mounted to the outer case via the spokes; a radial positioning apparatus mounted to the outer case, the apparatus including at least three radial locators threadedly mounted to the outer case and having a terminal portion extending radially outwardly of the outer case, the radial locators configured to adjust the radial position of the inner case relative to the outer case when the radial locators are threadingly adjusted relative to the outer case; and a locking apparatus associated with each radial locator, the locking apparatus mounted to an outer surface of the outer case by a fastening apparatus independent of the radial locator, the locking apparatus including at least one keying surface keyed to a corresponding surface on the terminal portion of the radial locator, said keying and corresponding surfaces cooperating to impede rotation of the radial locator when the locking apparatus is mounted to the outer case.

According to another aspect, provided is a gas turbine engine having a mid turbine frame, the mid turbine frame comprising: an outer case, an inner case, at least three spokes extending radially between the inner and outer cases, and a gas path defined through the mid turbine frame, the gas path disposed between the inner and outer cases, the inner case supporting at least one main shaft bearing, the inner case radially adjustably mounted to the outer case via the spokes; a radial positioning apparatus mounted to the outer case, the apparatus including plurality of radial locators threadedly mounted to the outer case and having a terminal portion extending radially outwardly of the outer case, the radial locators configured to adjust the radial position of the inner case relative to the outer case when the radial locators are threadingly adjusted relative to the outer case; and a locking apparatus associated with each radial locator, the locking apparatus mounted to an outer surface of the outer case by a fastening apparatus independent of the radial locator, the locking apparatus including a pair of flats cooperating with a mating pair of flats on the terminal portion of the radial locator.

Further details of these and other aspects will be apparent from the following description.

DESCRIPTION OF THE DRAWINGS

Reference is now made to the accompanying drawings, in which.

DETAILED DESCRIPTION

Figure 1:
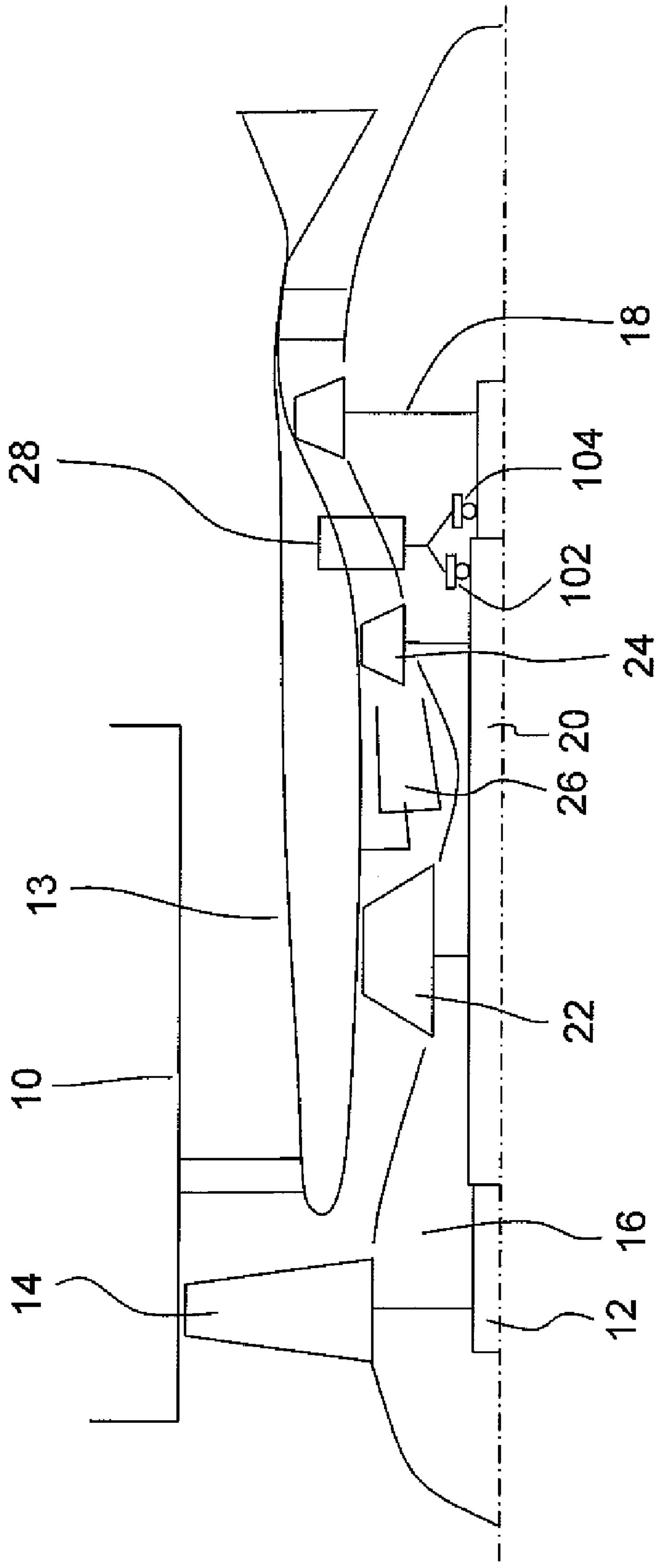
FIG. 1 is a schematic cross-sectional view of a turbofan gas turbine engine according to the present description.

Referring to FIG. 1, a bypass gas turbine engine includes a fan case 10, a core case 13, a low pressure spool assembly which includes a fan assembly 14, a low pressure compressor assembly 16 and a low pressure turbine assembly 18 connected by a shaft 12, and a high pressure spool assembly which includes a high pressure compressor assembly 22 and a high pressure turbine assembly 24 connected by a turbine shaft 20. The core case 13 surrounds the low and high pressure spool assemblies to define a main fluid path therethrough. In the main fluid path there is provided a combustor 26 to generate combustion gases to power the high pressure turbine assembly 24 and the low pressure turbine assembly

18. A mid turbine frame system 28 is disposed between the high pressure turbine assembly 24 and the low pressure turbine assembly 18 and supports bearings 102 and 104 around the respective shafts 20 and 12.

Referring to FIGS. 1-5, the mid turbine frame system 28 includes an annular outer case 30 which has mounting flanges (not numbered) at both ends with mounting holes therethrough (not shown), for connection to other components (not shown) which co-operate to provide the core case 13 of the engine. The outer case 30 may thus be a part of the core case 13. A spoke casing 32 includes an annular inner case 34 coaxially disposed within the outer case 30 and a plurality of (at least three, but seven in this example) load transfer spokes 36 radially extending between the outer case 30 and the inner case 34. The inner case 34 generally includes an annular axial wall 38 and truncated conical wall 33 smoothly connected through a curved annular configuration 35 to the annular axial wall 38 and an inner annular wall 31 having a flange (not numbered) for connection to a bearing housing 50, described further below. A pair of gussets or stiffener ribs 89 (see also FIG. 3) extends from conical wall 33 to an inner side of axial wall 38 to provide locally increased radial stiffness in the region of spokes 36 without increasing the wall thickness of the inner case 34. The spoke casing 32 supports a bearing housing 50 which surrounds a main shaft of the engine such as shaft 12, in order to accommodate one or more bearing assemblies therein, such as those indicated by numerals 102, 104 (shown in broken lines in FIG. 4). The bearing housing 50 is centered within the annular outer case 30 and is connected to the spoke casing 32, which will be further described below.

The load transfer spokes 36 are each affixed at an inner end 48 thereof to the axial wall 38 of the inner case 34, for example by welding. The spokes 36 may either be solid or hollow—in this example, at least some are hollow (e.g. see FIG. 2), with a central passage **78*a* therein. Each of the load transfer spokes 36 is connected at an outer end 47 (see FIG. 9) thereof, to the outer case 30, by a plurality of fasteners 42. The fasteners 42 extend radially through openings 46 (see FIG. 5) defined in the outer case 30, and into holes 44 defined in the outer end 47 of the spoke 36**.

Figure 3:
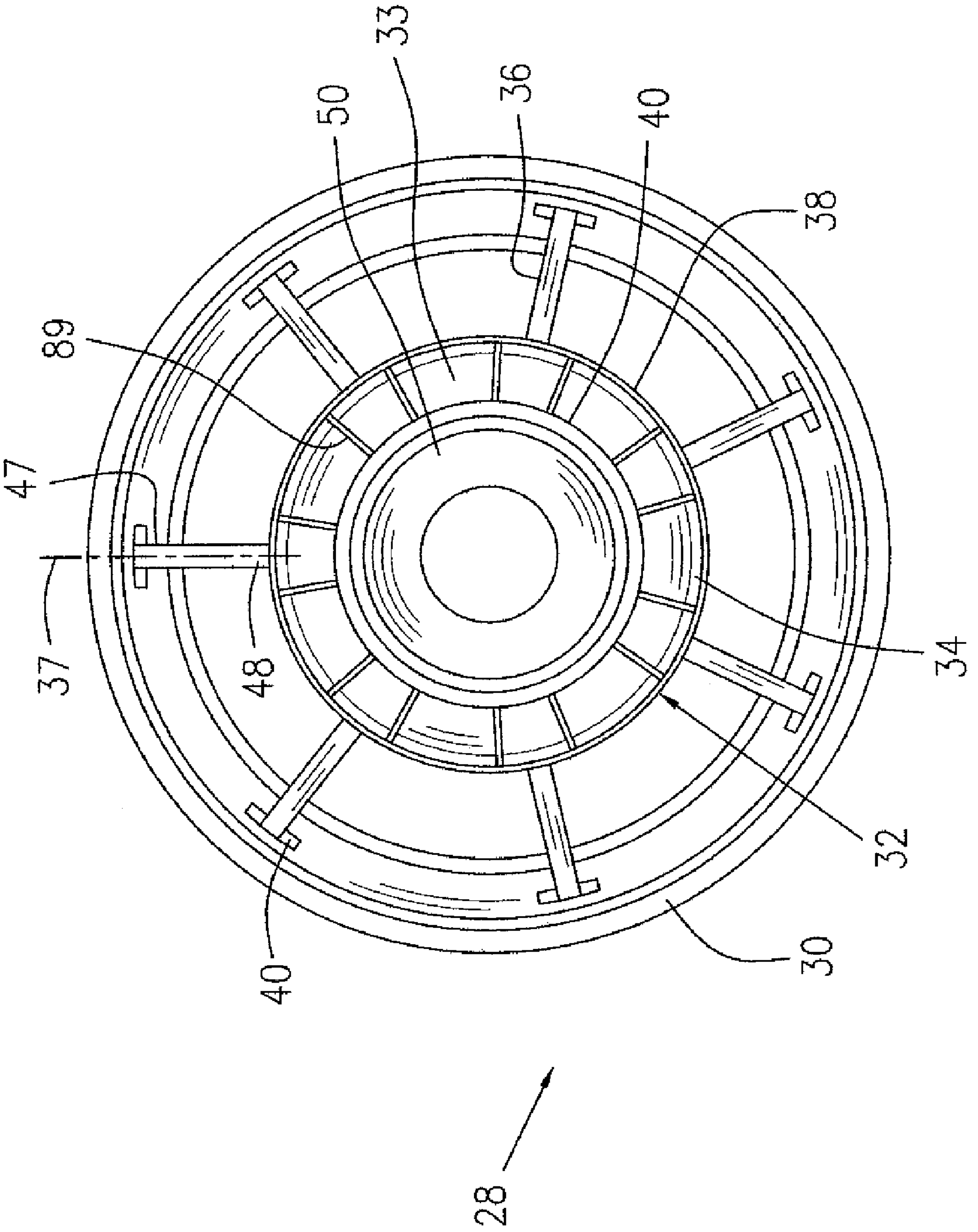
FIG. 3 is rear elevational view of the mid turbine frame system of FIG. 2, with a segmented strut-vane ring assembly and rear baffle removed for clarity.

The load transfer spokes 36 each have a central axis 37 and the respective axes 37 of the plurality of load transfer spokes 36 extend in a radial plane (i.e. the paper defined by the page in FIG. 3).

Figure 9:
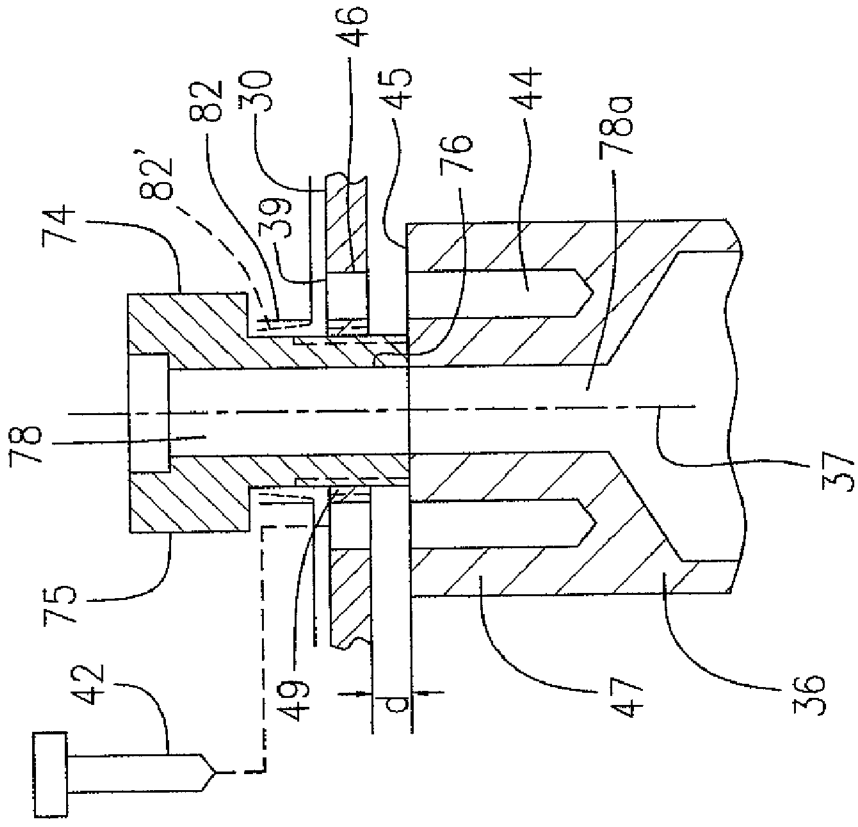
FIG. 9 is a partial cross-sectional view of the mid turbine frame system showing a radial locator to locate one spoke of a spoke casing in its radial position with respect to the outer case.

The outer case 30 includes a plurality of (seven, in this example) support bosses 39, each being defined as having a flat base substantially normal to the spoke axis 37. Therefore, the load transfer spokes 36 are generally perpendicular to the flat bases of the respective support bosses 39 of the outer case 30. The support bosses 39 are formed by a plurality of respective recesses 40 defined in the outer case 30. The recesses 40 are circumferentially spaced apart one from another corresponding to the angular position of the respective load transfer spokes 36. The openings 49 with inner threads, as shown in FIG. 9, are provided through the bosses 39. The outer case 30 in this embodiment has a truncated conical configuration in which a diameter of a rear end of the outer case 30 is larger than a diameter of a front end of the outer case 30. Therefore, a depth of the boss 39/recess 40 varies, decreasing from the front end to the rear end of the outer case 30. A depth of the recesses 40 near to zero at the rear end of the outer case 30 to allow axial access for the respective load transfer spokes 36 which are an integral part of the spoke casing 32. This allows the spokes 36 to slide axially forwardly into respective recesses 40 when the spoke casing 32 is slide slides into the outer case 30 from the rear side during mid turbine frame assembly, which will be further described hereinafter.

Figure 4:
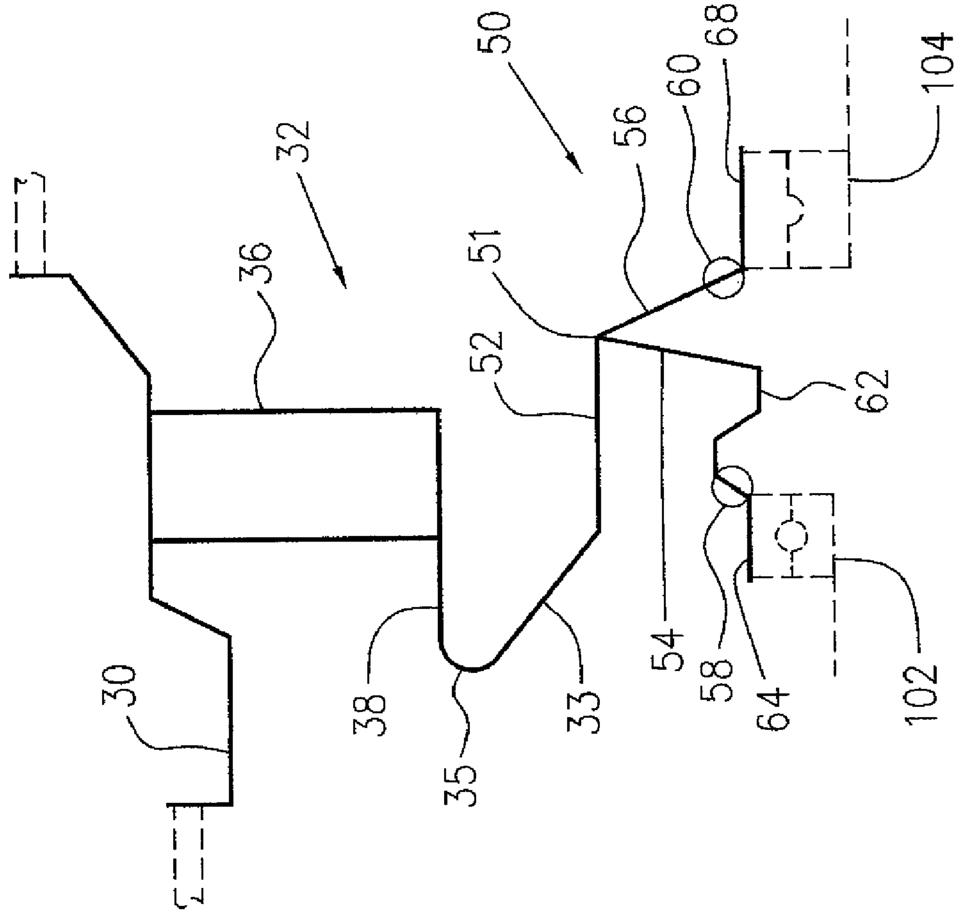
FIG. 4 is a schematic illustration the mid turbine frame system of FIG. 3, showing a load transfer link from bearings to the engine casing.
Figure 5:
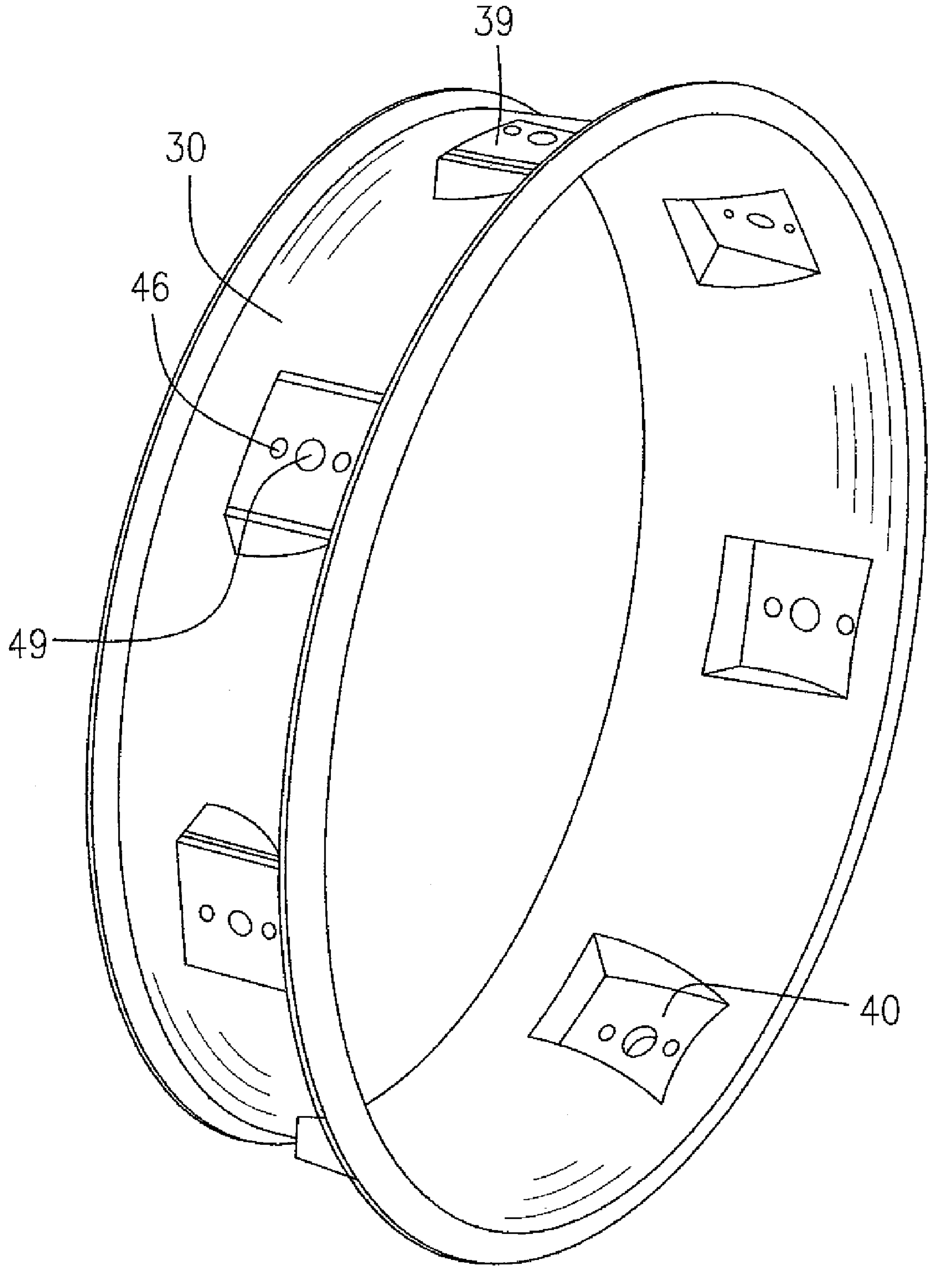
FIG. 5 is a perspective view of an outer case of the mid turbine frame system.

In FIGS. 2-4 and 6-7, the bearing housing 50 includes an annular axial wall 52 detachably mounted to an annular inner end of the truncated conical wall 33 of the spoke casing 32, and one or more annular bearing support legs for accommodating and supporting one or more bearing assemblies, for example a first annular bearing support leg 54 and a second annular bearing support leg 56 according to one embodiment. The first and second annular bearing support legs 54 and 56 extend radially and inwardly from a common point 51 on the axial wall 52 (i.e. in opposite axial directions), and include axial extensions 62, 68, which are radially spaced apart from the axial wall 52 and extend in opposed axial directions, for accommodating and supporting the outer races axially spaced first and second main shaft bearing assemblies 102, 104. Therefore, as shown in FIG. 4, the mid turbine frame system 28 provides a load transfer link or system from the bearings 102 and 104 to the outer case 30, and thus to the core casing 13 of the engine. In this load transfer link of FIG. 4, there is a generally U- or hairpin-shaped axially oriented apparatus formed by the annular wall 52, the truncated conical wall 33, the curved annular wall 35 and the annular axial wall 38, which co-operate to provide an arrangement which may be tuned to provide a desired flexibility/stiffness to the MTF by permitting flexure between spokes 36 and the bearing housing 50. Furthermore, the two annular bearing support legs 54 and 56, which connect to the U- or hairpin-shaped apparatus at the common joint 51, provide a sort of inverted V-shaped apparatus between the hairpin apparatus and the bearings, which may permit the radial flexibility/stiffness of each of the bearing assemblies 102, 104 to vary from one another, allowing the designer to provide different radial stiffness requirements to a plurality of bearings within the same bearing housing. For example, bearing 102 supports the high pressure spool while bearing 104 the low pressure spool—it may be desirable for the shafts to be supported with differing radial stiffnesses, and the present approach permits such a design to be achieved. Flexibility/stiffness may be tuned to desired levels by adjusting the bearing leg shape (for example, the conical or cylindrical shape of the legs 54,56 and extensions 62,68), axial position of legs 54, 56 relative to bearings 102, 104, the thicknesses of the legs, extensions and bearing supports, materials used, etc., as will be understood by the skilled reader.

Additional support structures may also be provided to support seals, such as seal 81 supported on the inner case 34, and seals 83 and 85 supported on the bearing housing 50.

Figure 2:
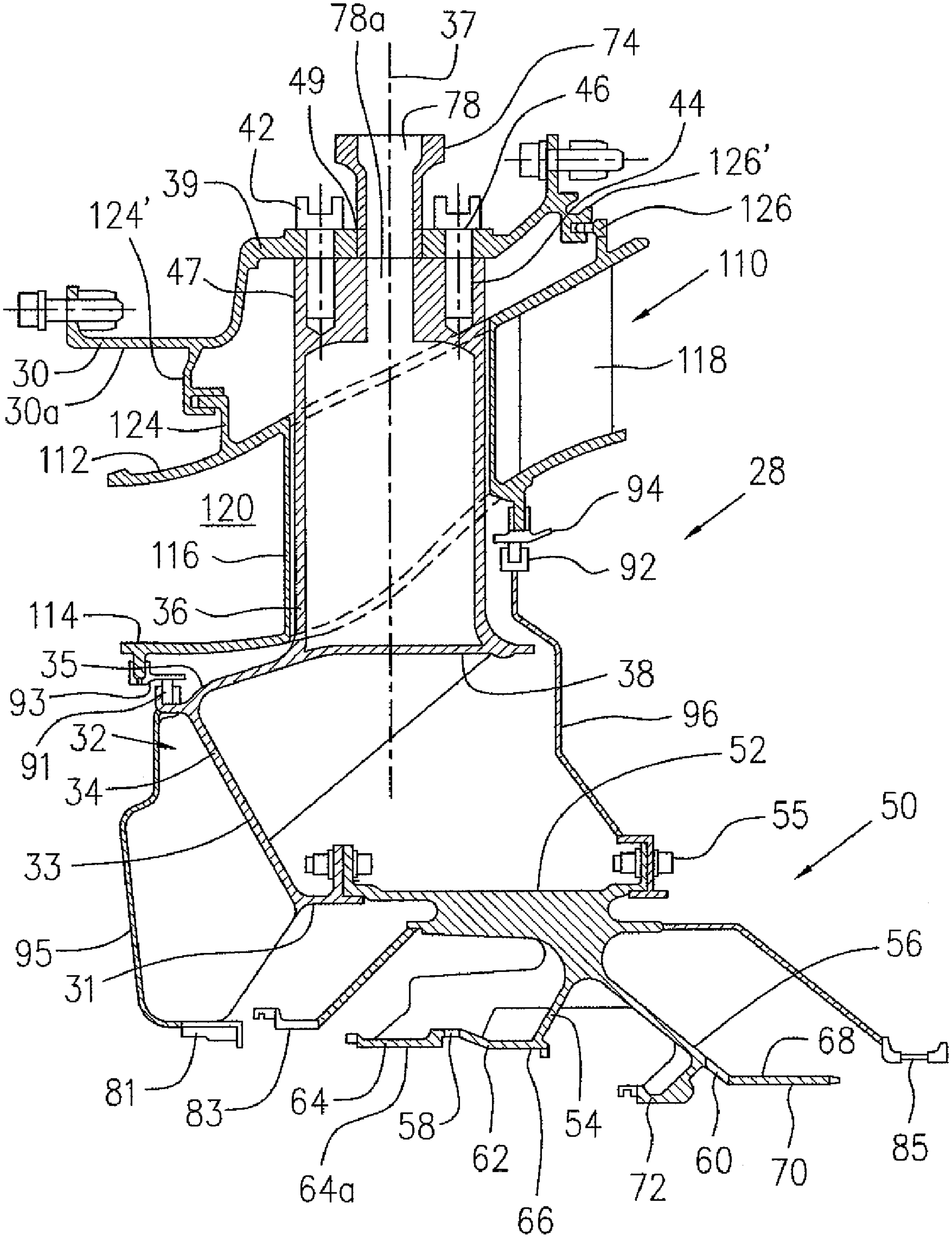
FIG. 2 is a cross-sectional view of the mid turbine frame system according to one embodiment.
Figure 7:
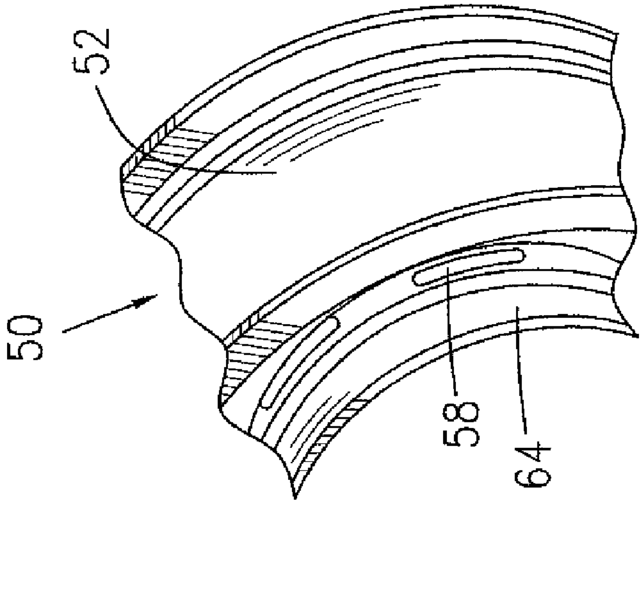
FIG. 7 is a partial front perspective view of the bearing housing, showing slots as "fuse" elements for another bearing support leg of the housing according to another embodiment.
Figure 6:
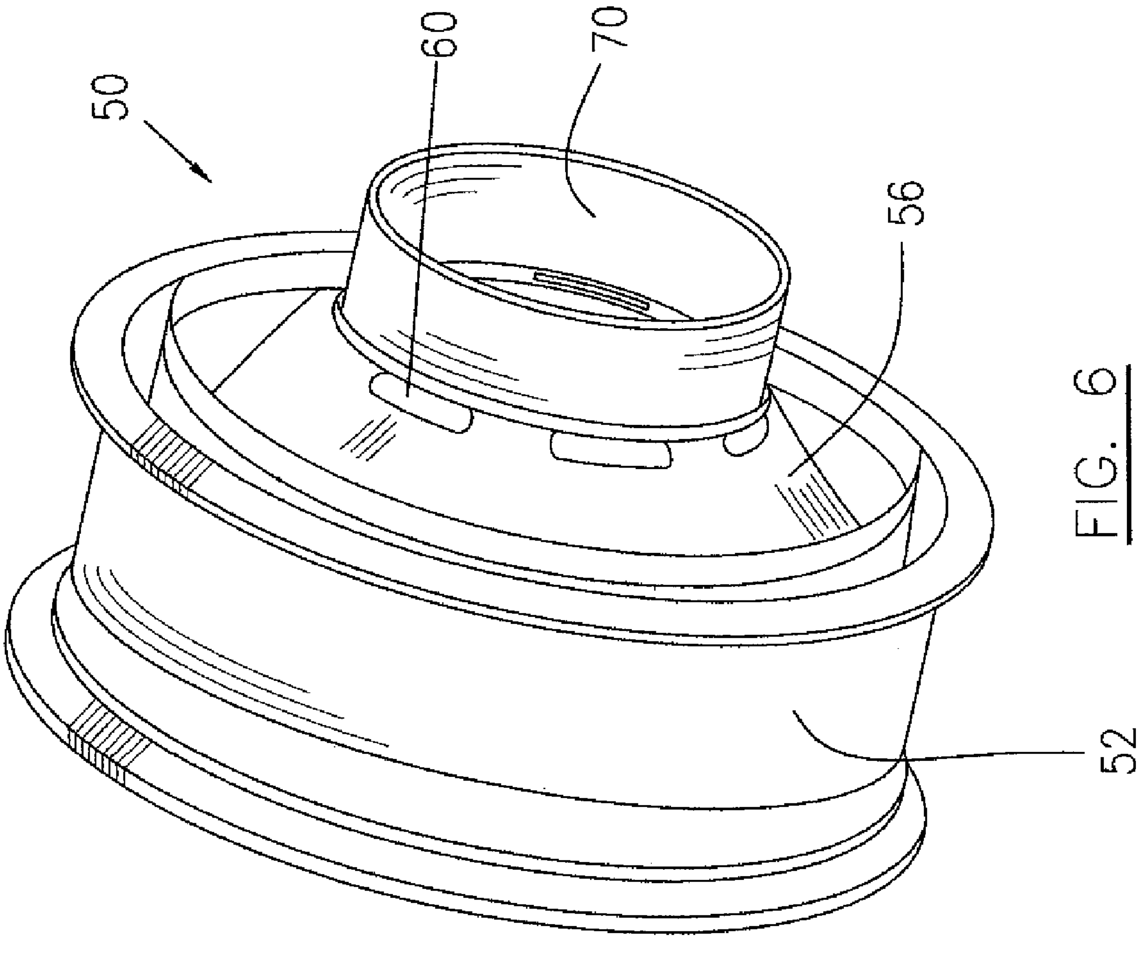
FIG. 6 is a rear perspective view of a bearing housing of the mid turbine frame system according to an embodiment.

One or more of the annular bearing support legs 54, 56 may further include a sort of mechanical "fuse", indicated by numerals 58 and 60 in FIG. 4, intended to preferentially fail during a severe load event such as a bearing seizure. Referring to FIGS. 2, 6 and 7, in one example, such a "fuse" may be provided by a plurality of (e.g. say, 6) circumferential slots 58 and 60 respectively defined circumferentially spaced apart one from another around the first and second bearing support legs 54 and 56. For example, slots 58 may be defined radially through the annular first bearing support leg 54. Slots 58 may be located in the axial extension 62 and axially between a bearing support section 64 and a seal section 66 in order to fail only in the bearing support section 64 should bearing 102 seize. That is, the slots are sized such that the bearing leg is capable of handling normal operating load, but is incapable of transferring ultimate loads therethrough to the MTF. Such a preferential failure mechanism may help protect, for example, oil feed lines or similar components, which may pass through the MTF (e.g. through passage 78), from damage causing oil leaks (i.e. fire risk), and/or may allow the seal supported on section 66 of the first annular bearing support leg 54 to maintain a central position of a rotor supported by the bearing, in this example the high pressure spool assembly, until the engine stops. Similarly, the slots 60 may be defined radially through the second annular bearing leg 56. Slots 60 may be located in the axial extension 68 and axially between a bearing support section 70 and a seal section 72 in order to fail only in the bearing support section 70 should bearing 104 seize. This failure mechanism also protects against possible fire risk of the type already described, and may allow the seal section 72 of the second annular bearing leg 56 to maintain a central position of a rotor supported by the bearing, in this example the low pressure spool assembly, until the engine stops. The slots 58, 60 thus create a strength-reduced area in the bearing leg which the designer may design to limit torsional load transfer through leg, such that this portion of the leg will preferentially fail if torsional load transfer increases above a predetermined limit. As already explained, this allows the designer to provide means for keeping the rotor centralized during the unlikely event of a bearing seizure, which may limit further damage to the engine.

Referring to FIGS. 1, 2, 9, 10 and 1, the mid turbine frame system 28 may be provided with a plurality of radial locators 74 for radially positioning the spoke casing 32 (and thus, ultimately, the bearings 102, 104) with respect to the outer case 30. For example, referring again to FIG. 2, it is desirable that surfaces 30*a* and 64*a* are concentric after assembly is complete. The number of radial locators may be less than the number of spokes. The radial locators 74 may be radially adjustably attached to the outer case 30 and abutting the outer end of the respective load transfer spokes 36.

In this example, of the radial locators 74 include a threaded stem 76 and a head 75. Head 75 may be any suitable shape to co-operate with a suitable torque applying tool (not shown). The threaded stem 76 is rotatably received through a threaded opening 49 defined through the support boss 39 to contact an outer end surface 45 of the end 47 of the respective load transfer spoke 36. The outer end surface 45 of the load transfer spoke 36 may be normal to the axis of the locator 74, such that the locator 74 may apply only a radial force to the spoke 36 when tightened. A radial gap "d" (see FIG. 9) may be provided between the outer end surface 45 of the load transfer spoke 36 and the support boss 39. The radial gap "d" between each spoke and respective recess floor 40 need only be a portion of an expected tolerance stack-up error, e.g. typically a few thousandths of an inch, as the skilled reader will appreciate. Spoke casing 32 is thus adjustable through adjustment of the radial locators 74, thereby permitting centering of the spoke casing 32, and thus the bearing housing 50, relative to the outer case 30. Use of the radial locators 72 will be described further below.

One or more of the radial locators 74 and spokes 36 may have a radial passage 78 extending through them, in order to provide access through the central passage 78*a* of the load transfer spokes 36 to an inner portion of the engine, for example, for oil lines or other services (not depicted).

The radial locator assembly may be used with other mid turbine configurations, such as the one generally described in applicant's application Ser. No. 12/324,984 entitled MID TURBINE FRAME FOR GAS TURBINE ENGINE filed concurrently herewith, incorporated herein by reference, and further is not limited to use with so-called "cold strut" mid turbine frames or other similar type engine cases, but rather may be employed on any suitable gas turbine casing arrangements.

A suitable locking apparatus may be provided to lock the radial locators 74 in position, once installed and the spoke casing is centered. In one example shown in FIGS. 9-12, a lock washer 80 including holes 43 and radially extending arms 82, is secured to the support boss 39 of the outer case 30 by the fasteners 42 which are also used to secure the load transfer spokes 36 (once centered) to the outer case 30. The radial locator 74 is provided with flats 84, such as hexagon surfaces defined in an upper portion of the stem 76. When the radial locator 74 is adjusted with respect to the support boss 39 to suitably centre the spoke casing 32, the radially extending arms 82 of the lock washer 80 may then be deformed to pick up on the flats 84 (as indicated by broken line 82' in FIG. 9) in order to prevent rotation of the radial locator 74. This allows the radial positioning of the spoke casing to be fixed once centered.

Figure 13:
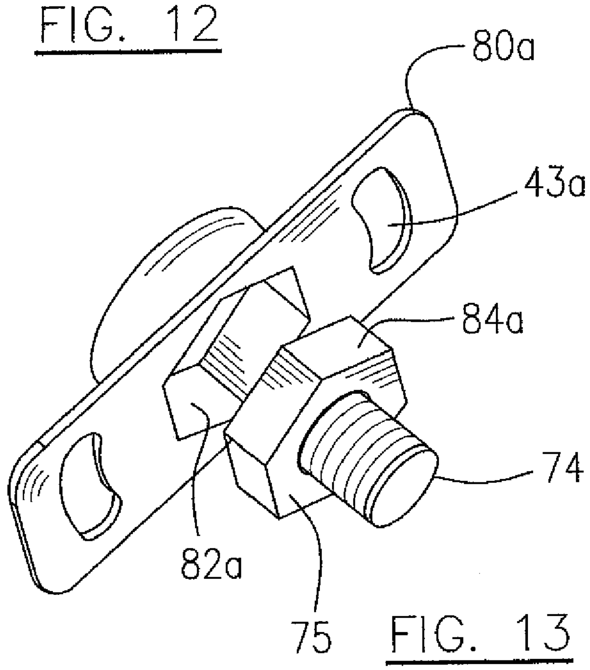
FIG. 13 is a perspective view of another embodiment of a locking arrangement.
Figure 14:
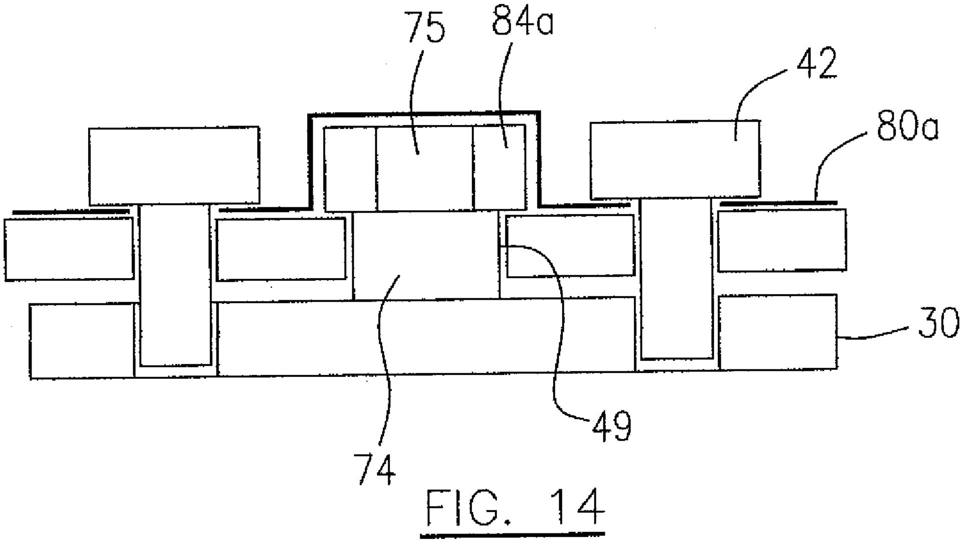
FIG. 14 is a schematic illustration of a partial cross-sectional view, similar to FIG. 9, of the arrangement of FIG. 13.

Referring to FIG. 13, in another example, lock washer 80*a* having a hexagonal pocket shape, with flats 82*a* defined in the pocket interior, fits over flats 84*a* of head 75 of radial locator 74, where radial locator 74 has a hexagonal head shape. After the radial locator 74 is adjusted to position, lock washer 80*a* is installed over head 75, with the flats 82*a* aligned with head flats 84*a*. Fasteners 42 are then attached into case 30 through holes 43*a*, to secure lock washer 80*a* in position, and secure the load transfer spokes 36 to the outer case 30. Due to different possible angular positions of the hexagonal head 75, holes 43*a* are actually angular slots defined to ensure fasteners 42 will always be able to fasten lock washer 80*a* in the holes provided in case 30, regardless of a desired final head orientation for radial locator 74. As may be seen in FIG. 14, this type of lock washer 80*a* may also provide sealing by blocking air leakage through hole 49.

It will be understood that a conventional lock washer is retained by the same bolt that requires the locking device—i.e. the head typically bears downwardly on the upper surface of the part in which the bolt is inserted. However, where the head is positioned above the surface, and the position of the head above the surface may vary (i.e. depending on the position required to radially position a particular MTF assembly), the conventional approach presents problems.

Figure 8:
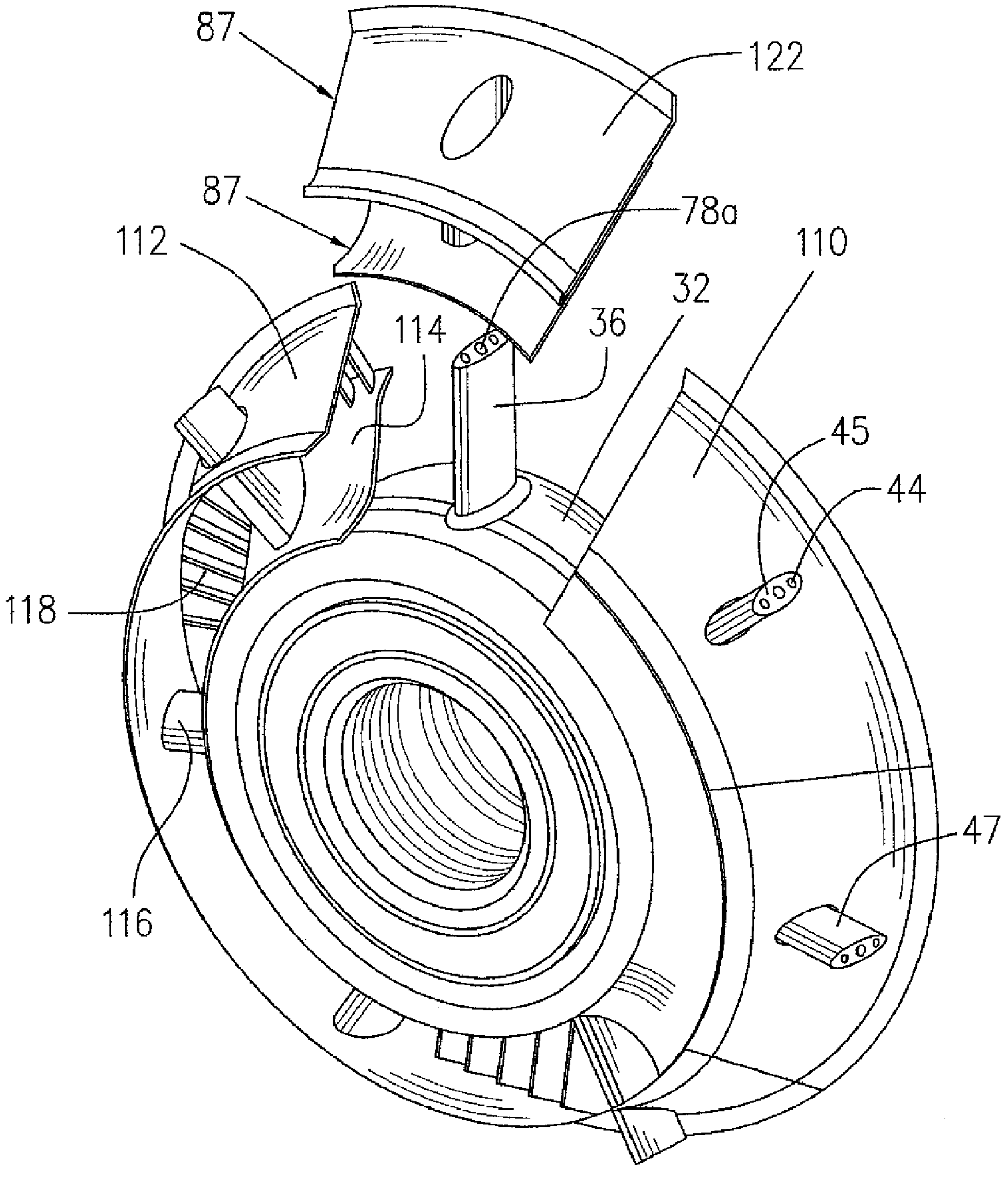
FIG. 8 is a partially exploded perspective view of the mid turbine frame system of FIG. 2, showing a step of installing a segmented strut-vane ring assembly in the mid turbine frame system.
Figure 11:
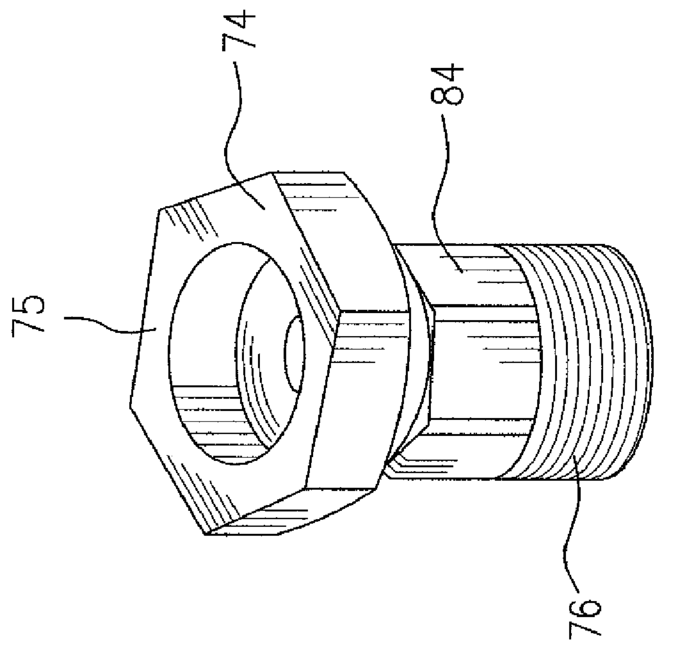
FIG. 11 is a perspective view of the radial locator used in the embodiment shown in FIGS. 9 and 10.
Figure 10:
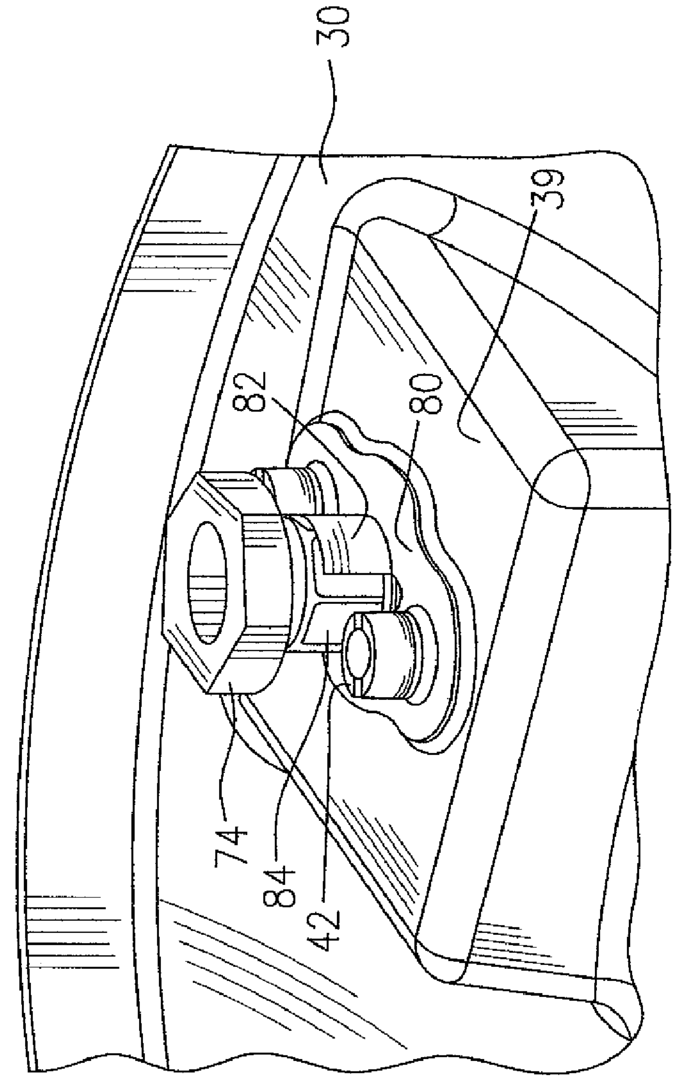
FIG. 10 is a partial perspective view of a mid turbine frame system showing one of the radial locators in position locked according to one embodiment.
Figure 12:
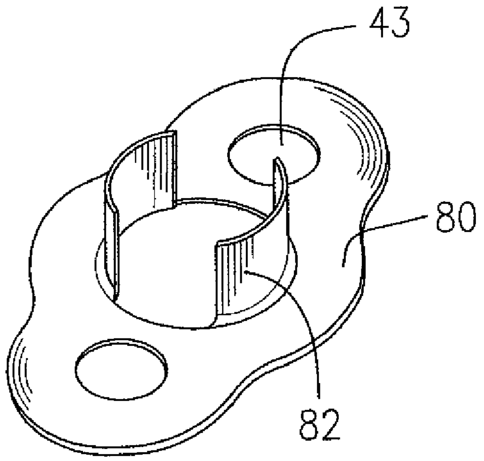
FIG. 12 is a perspective view of the lock washer of FIGS. 9 and 10.

Referring to FIGS. 2 and 8, the mid turbine frame system 28 may include an interturbine duct (ITD) assembly 110, such as a segmented strut-vane ring assembly (also referred to as an ITD-vane ring assembly), disposed within and supported by the outer case 30. The ITD assembly 110 includes coaxial outer and inner rings 112, 114 radially spaced apart and interconnected by a plurality of radial hollow struts 116 (at least three) and a plurality of radial airfoil vanes 118. The number of hollow struts 116 is less than the number of the airfoil vanes 118 and equivalent to the number of load transfer spokes 36 of the spoke casing 32. The hollow struts 116, function substantially as a structural linkage between the outer and inner rings 112 and 114. The hollow struts 116 are aligned with openings (not numbered) defined in the respective outer and inner rings 112 and 114 to allow the respective load transfer spokes 36 of the spoke casing 32 to radially extend through the ITD assembly 110 to be connected to the outer case 30. The hollow struts 116 also define an aerodynamic airfoil outline to reduce fluid flow resistance to combustion gases flowing through an annular gas path 120 defined between the outer and inner rings 112, 114. The airfoil vanes 118 are employed substantially for directing these combustion gases. Neither the struts 116 nor the airfoil vanes 118 form a part of the load transfer link as shown in FIG. 4 and thus do not transfer any significant structural load from the bearing housing 50 to the outer case 30. The load transfer spokes 36 provide a so-called "cold strut" arrangement, as they are protected from high temperatures of the combustion gases by the surrounding wall of the respective struts 116, and the associated air gap between struts 116 and spokes 36, both of which provide a relatively "cold" working environment for the spokes to react and transfer bearing loads, In contrast, conventional "hot" struts are both aerodynamic and structural, and are thus exposed both to hot combustion gases and bearing load stresses.

The ITD assembly 110 includes a plurality of circumferential segments 122. Each segment 122 includes a circumferential section of the outer and inner rings 112, 114 interconnected by only one of the hollow struts 116 and by a number of airfoil vanes 118. Therefore, each of the segments 122 can be attached to the spoke casing 32 during an assembly procedure, by inserting the segment 122 radially inwardly towards the spoke casing 32 and allowing one of the load transfer spokes 36 to extend radially through the hollow strut 116. Suitable retaining elements or vane lugs 124 and 126 may be provided, for example, towards the upstream edge and downstream edge of the outer ring 112 (see FIG. 2), for engagement with corresponding retaining elements or case slots 124', 126', on the inner side of the outer case 30.

Figure 15:
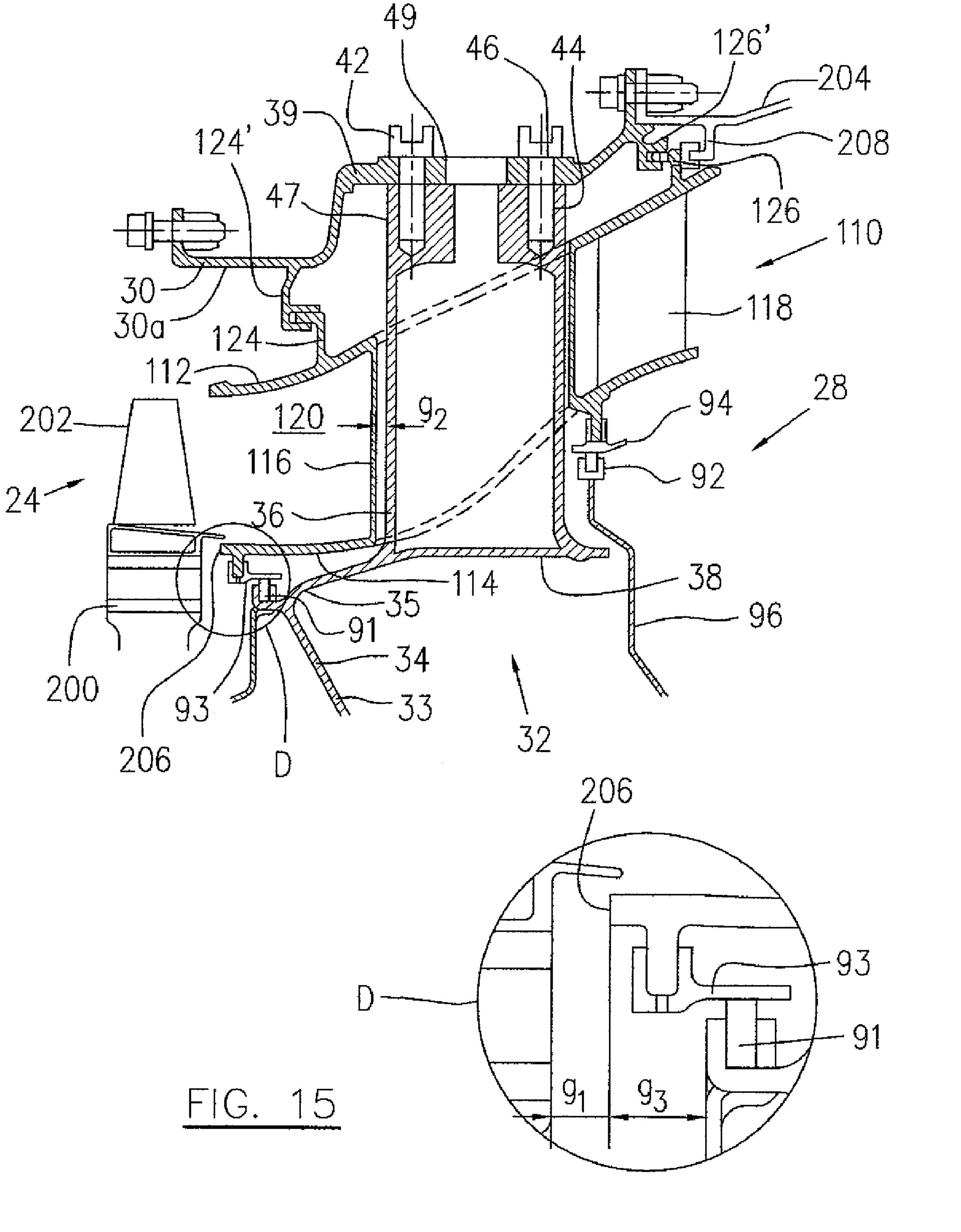
FIG. 15 is a view similar to FIG. 2 of another mid turbine frame apparatus with a circled area showing gaps $g_1$ and $g_3$ in enlarged scale.

Referring to FIG. 15, mid turbine frame 28 is shown again, but in this view an upstream turbine stage which is part of the high pressure turbine assembly 24 of FIG. 1, comprising a turbine rotor (not numbered) having a disc 200 and turbine blade array 202, is shown, and also shown is a portion of the low pressure turbine case 204 connected to a downstream side of MTF 28 (fasteners shown but not numbered). The turbine disc 200 is mounted to the turbine shaft 20 of FIG. 1. A upstream edge 206 of inner ring 114 of the ITD assembly 110 extends forwardly (i.e. to the left in FIG. 15) of the forward-most point of spoke casing 32 (in this example, the forward-most point of spoke casing 32 is the seal 91), such that an axial space $g_3$ exists between the two. The upstream edge 206 is also located at a radius within an outer radius of the disc 200. Both of these details will ensure that, should high pressure turbine shaft 20 (see FIG. 1) shear during engine operation in a manner that permits high pressure turbine assembly 24 to move rearwardly (i.e. to the right in FIG. 15), the disc 200 will contact the ITD assembly 110 (specifically upstream edge 206) before any contact is made with the spoke casing 32. This will be discussed again in more detail below. A suitable axial gap $g_1$ may be provided between the disc 200 and the upstream edge 206 of the ITD assembly 110. The gaps $g_1$ may be smaller than $g_3$ as shown in the circled area "D" in an enlarged scale.

Referring still to FIG. 15, one notices seal arrangement 91-93 at a upstream edge portion of the ITD assembly 110, and similarly seal arrangement 92-94 at a downstream edge portion of the ITD assembly 110, provides simple radial supports (i.e. the inner ring 114 is simply supported in a radial direction by inner case 34) which permits an axial sliding relationship between the inner ring 114 and the spoke case 32. Also, it may be seen that axial gap $g_2$ is provided between the upstream edge of the load transfer spokes 36 and the inner periphery of the hollow struts 116, and hence some axial movement of the ITD assembly 110 can occur before strut 116 would contact spoke 36 of spoke casing 32. As well, it may be seen that vane lugs 124 and 126 are forwardly inserted into case slots 124', 126', and thus may be permitted to slide axially rearwardly relative to outer case 30. Finally, outer ring 112 of the ITD assembly 110 abuts a downstream catcher 208 on low pressure turbine case 204, and thus axial rearward movement of the ITD assembly 110 would be restrained by low turbine casing 204. In summary, it is therefore apparent that the ITD assembly 110 is slidingly supported by the spoke casing 32, and may also be permitted to move axially rearwardly of outer case 30 without contacting spoke casing 32 (for at least the distance $g_2$), however, axial rearward movement would be restrained by low pressure turbine case 204, via catcher 208.

A load path for transmitting loads induced by axial rearward movement of the turbine disc 200 in a shaft shear event is thus provided through ITD assembly 110 independent of MTF 28, thereby protecting MTF 28 from such loads, provided that gap $g_2$ is appropriately sized, as will be appreciated by the skilled reader in light of this description. Considerations such as the expected loads, the strength of the ITD assembly, etc. will affect the sizing of the gaps. For example, the respective gaps $g_2$ and $g_3$ may be greater than an expected interturbine duct upstream edge deflection during a shaft shear event.

It is thus possible to provide an MTF 28 free from axial load transmission through MTF structure during a high turbine rotor shaft shear event, and rotor axial containment may be provided independent of the MTF which may help to protect the integrity of the engine during a shaft shear event. Also, more favourable reaction of the bending moments induced by the turbine disc loads may be obtained versus if the loads were reacted by the spoke casing directly. As described, axial clearance between disc, ITD and spoke casing may be designed to ensure first contact will be between the high pressure turbine assembly 24 and ITD assembly 110 if shaft shear occurs. The low pressure turbine case 204 may be designed to axial retain the ITD assembly and axially hold the ITD assembly during such a shaft shear. Also as mentioned, sufficient axial clearance may be provided to ensure the ITD assembly will not contact any spokes of the spoke casing. Lastly, the sliding seal configurations may be provided to further ensure isolation of the spoke casing form the axial movement of ITD assembly. Although depicted and described herein in context of a segmented and cast interturbine duct assembly, this load transfer mechanism may be used with other cold strut mid turbine frame designs, for example such as the fabricated annular ITD described in applicant's application Ser. No. 12/324,984 entitled MID TURBINE FRAME FOR GAS TURBINE ENGINE filed concurrently herewith, and incorporated herein by reference. Although described as being useful to transfer axial loads incurred during a shaft shear event, the present mechanism may also or additionally be used to transfer other primarily axial loads to the engine case independently of the spoke casing assembly.

Assembly of a sub-assembly may be conducted in any suitable manner, depending on the specific configuration of the mid turbine frame system 28. Assembly of the mid turbine frame system 28 shown in FIG. 8 may occur from the inside out, beginning generally with the spoke casing 32, to which the bearing housing 50 may be mounted by fasteners 53. A piston ring 91 may be mounted at the front end of the spoke casing.

A front inner seal housing ring 93 is axially slid over piston ring 91. The vane segments 122 are then individually, radially and inwardly inserted over the spokes 36 for attachment to the spoke casing 32. Feather seals 87 (FIG. 8) may be provided between the inner and outer shrouds of adjacent segments 122. A flange (not numbered) at the front edge of each segment 122 is inserted into seal housing ring 93. A rear inner seal housing ring 94 is installed over a flange (not numbered) at the rear end of each segment. Once the segments 122 are attached to the spoke casing 32, the ITD assembly 110 is provided. The outer ends 47 of the load transfer spokes 36 extend radially and outwardly through the respective hollow struts 116 of the ITD assembly 110 and project radially from the outer ring 112 of the ITD assembly 110.

Referring to FIGS. 2, 5 and 8-9, the outer ends 47 of the respective load transfer spokes 36 are circumferentially aligned with the respective radial locators 74 which are adjustably threadedly engaged with the openings 49 of the outer case 30. The ITD assembly 110 is then inserted into the outer case 30 by moving them axially towards one another until the sub-assembly is situated in place within the outer case 30 (suitable fixturing may be employed, in particular, to provide concentricity between surface 30*a* of case 30 and surface 64*a* of the ITD assembly 110). Because the diameter of the rear end of the outer case 30 is larger than the front end, and because the recesses 40 defined in the inner side of the outer case 30 to receive the outer end 47 of the respective spokes 36 have a depth near zero at the rear end of the outer case 30 as described above, the ITD assembly 110 may be inserted within the outer case 30 by moving the sub-assembly axially into the rear end of the outer case 30. The ITD assembly 110 is mounted to the outer case 30 by inserting lugs 124 and 126 on the outer ring 112 to engage corresponding slots 124', 126' on the inner side of the case 30, as described above.

The radial locators 74 are then individually inserted into case 30 from the outside, and adjusted to abut the outer surfaces 45 of the ends 47 of the respective spokes 36 in order to adjust radial gap "d" between the outer ends 47 of the respective spokes 36 and the respective support bosses 39 of the outer case 30, thereby centering the annular bearing housing 50 within the outer case 30. The radial locators 74 may be selectively rotated to make fine adjustments to change an extent of radial inward protrusion of the end section of the stem 76 of the respective radial locators 74 into the support bosses 39 of the outer case 30, while maintaining contact between the respective outer ends surfaces 45 of the respective spokes 36 and the respective radial locators 74, as required for centering the bearing housing 50 within the outer case 30. After the step of centering the bearing housing 50 within the outer case 30, the plurality of fasteners 42 are radially inserted through the holes 46 defined in the support bosses 39 of the outer case 30, and are threadedly engaged with the holes 44 defined in the outer surfaces 45 of the end 47 of the load transfer spokes 36, to secure the ITD assembly 110 to the outer case 30.

The step of fastening the fasteners 42 to secure the ITD assembly 110 may affect the centering of the bearing housing 50 within the outer case 30 and, therefore, further fine adjustments in both the fastening step and the step of adjusting radial locators 74 may be required. These two steps may therefore be conducted in a cooperative manner in which the fine adjustments of the radial locators 74 and the fine adjustments of the fasteners 42 may be conducted alternately and/or in repeated sequences until the sub-assembly is adequately secured within the outer case 30 and the bearing housing 50 is centered within the outer case 30.

Optionally, a fixture may be used to roughly center the bearing housing of the sub-assembly relative to the outer case 30 prior to the step of adjusting the radial locators 74.

Optionally, the fasteners may be attached to the outer case and loosely connected to the respective spoke prior to attachment of the radial locaters 74 to the outer case 30, to hold the sub-assembly within the outer case 30 but allow radial adjustment of the sub-assembly within the outer case 30.

Front baffle 95 and rear baffle 96 are then installed, for example with fasteners 55. Rear baffle includes a seal 92 cooperating in rear inner seal housing ring 94 to, for example, impede hot gas ingestion from the gas path into the area around the MTF. The outer case 30 may then by bolted (bolts shown but not numbered) to the remainder of the core casing 13 in a suitable manner.

Disassembly of the mid turbine frame system is substantially a procedure reversed to the above-described steps, except for those central position adjustments of the bearing housing within the outer case which need not be repeated upon disassembly.

The above description is meant to be exemplary only, and one skilled in the art will recognize that changes may be made to the embodiments described without departing from the scope of the subject matter disclosed. For example, the segmented strut-vane ring assembly may be configured differently from that described and illustrated in this application and engines of various types other than the described turbofan bypass duct engine will also be suitable for application of the described concept. As noted above, the radial locator/centering features described above are not limited to mid turbine frames of the present description, or to mid turbine frames at all, but may be used in other case sections needing to be centered in the engine, such as other bearing points along the engine case, e.g. a compressor case housing a bearing(s). The features described relating to the bearing housing and/or mid turbine load transfer arrangements are likewise not limited in application to mid turbine frames, but may be used wherever suitable. The bearing housing need not be separable from the spoke casing. The locking apparatus of FIGS. 12-14 need not involved cooperating flat surfaces as depicted, but my include any cooperative features which anti-rotate the radial locators, for example dimples of the shaft or head of the locator, etc. Any number (including one) of locking surfaces may be provided on the locking apparatus. Still other modifications which fall within the scope of the described subject matter will be apparent to those skilled in the art, in light of a review of this disclosure, and such modifications are intended to fall within the appended claims.

The invention claimed is:

1. A gas turbine engine having a mid turbine frame, the mid turbine frame comprising:

an outer case, an inner case, at least three spokes extending radially between the inner and outer cases, and a gas path defined through the mid turbine frame, the gas path disposed between the inner and outer cases, the inner case supporting at least one main shaft bearing, the inner case radially adjustably mounted to the outer case via the spokes;

a radial positioning apparatus mounted to the outer case, the apparatus including at least three radial locators threadedly mounted to the outer case, each of the radial locators having a terminal portion extending radially outwardly of the outer case and having an inner end in contact with an end surface of a respective one of the spokes, the end surface being substantially normal to a radial axis of the respective one of the spokes the radial locators configured to adjust the radial position of the inner case relative to the outer case when the radial locators are threadingly adjusted relative to the outer case; and a locking apparatus associated with each radial locator, the locking apparatus mounted to an outer surface of the outer case by a fastening apparatus independent of the radial locator, the locking apparatus including at least one keying surface keyed to a corresponding surface on the terminal portion of the radial locator, said keying and corresponding surfaces cooperating to impede rotation and thus radial movement of the radial locator relative to the outer case when the locking apparatus is mounted to the outer case.

2. The gas turbine of claim 1, wherein each locking apparatus comprises a flat plate fastened to the outer case by the fastening apparatus, the radial locator extending through the flat plate, wherein two keying surfaces extend substantially normally to the plate on two corresponding surfaces formed by opposed sides of the radial locator, and wherein said keying surfaces are keyed by being deformed against two said corresponding surfaces.

3. The gas turbine of claim 2, wherein the corresponding surfaces are planar surfaces provided on a cylindrical body of the terminal portion.

4. The gas turbine of claim 1, wherein the radial locator comprises a polygonal head at an extremity of the terminal portion, and wherein the locking apparatus comprises a plate mounted to the outer case by the fastening apparatus, the plate including a portion encircling at least a portion of the head, the encircling portion including said at least one keying surface, the at least one corresponding surfaces provided by the polygonal head.

5. The gas turbine of claim 1, wherein said fastening apparatus comprises fasteners which also mount the spokes to the outer case.

6. The gas turbine of claim 1 wherein fastening apparatus comprises threaded fasteners extending through arcuate slots in the flat plate, the arcuate slots having a constant radius about an axis of rotation of the radial locator thereby allowing a position of locking apparatus relative to outer case to be adjusted based on an angular position of the corresponding surfaces on the radial locator.

7. The gas turbine of claim 4 wherein the portion encircling the head comprises a pocket substantially covering the head.

8. A gas turbine engine having a mid turbine frame, the mid turbine frame comprising:

an outer case, an inner case, at least three spokes extending radially between the inner and outer cases, and a gas path defined through the mid turbine frame, the gas path disposed between the inner and outer cases, the inner case supporting at least one main shaft bearing, the inner case radially adjustably mounted to the outer case via the spokes;

a radial positioning apparatus mounted to the outer case, the apparatus including plurality of radial locators threadedly mounted to the outer case, each of the radial locators having a terminal portion extending radially outwardly of the outer case and having an inner end in contact with an end surface of a respective one of the spokes, the end surface being substantially normal to a radial axis of the respective spokes the radial locators configured to adjust the radial position of the inner case relative to the outer case when the radial locators are threadingly adjusted relative to the outer case; and a locking apparatus associated with each radial locator, the locking apparatus mounted to an outer surface of the outer case by a fastening apparatus independent of the radial locator, the locking apparatus including a pair of flats cooperating with a mating pair of flats on the terminal portion of the radial locator.

9. The gas turbine of claim 8, wherein each locking apparatus comprises a flat plate fastened to the outer case by the fastening apparatus, the radial locator extending through the flat plate, wherein two arms extend substantially normally to the plate on opposed sides of the radial locator, and wherein said locking apparatus flats are provided on the arms, the arms biased into contact with the mating pair of flats on the terminal portion of the radial locator.

10. The gas turbine of claim 9, wherein the mating flats are provided on a cylindrical body of the terminal portion.

11. The gas turbine of claim 8, wherein the radial locator includes a polygonal head at an extremity of the terminal portion, and wherein the locking apparatus comprises a plate mounted to the outer case by the fastening apparatus, the plate including a portion encircling at least a portion of the head, the encircling portion including said flats, and wherein the mating flats are provided by the polygonal head.

12. The gas turbine of claim 8, wherein said fastening apparatus comprises fasteners which also mount the spokes to the outer case.

13. The gas turbine of claim 8 wherein fastening apparatus comprises threaded fasteners extending through arcuate slots in the flat plate, the arcuate slots having a constant radius about an axis of rotation of the radial locator thereby allowing a position of locking apparatus relative to outer case to be adjusted based on an angular position of the mating flats of the radial locator.

14. The gas turbine of claim 11 wherein the portion encircling the head comprises a pocket substantially covering the head.

* * * * *